United States Patent
Chapman, Jr. et al.

(10) Patent No.: US 7,744,008 B2
(45) Date of Patent: *Jun. 29, 2010

(54) SYSTEM AND METHOD FOR REDUCING ENERGY CONSUMPTION BY CONTROLLING A WATER HEATER AND HVAC SYSTEM VIA A THERMOSTAT AND THERMOSTAT FOR USE THEREWITH

(75) Inventors: John Gilman Chapman, Jr., Delaware, OH (US); Nicholas Ashworth, Dublin, OH (US); Robert Burt, Columbus, OH (US); Timothy E. Wallaert, New Hudson, MI (US)

(73) Assignee: Robertshaw Controls Company, Carol Stream, IL (US)

( * ) Notice: Subject to any disclaimer, the term of this patent is extended or adjusted under 35 U.S.C. 154(b) by 1300 days.

This patent is subject to a terminal disclaimer.

(21) Appl. No.: 11/031,255

(22) Filed: Jan. 6, 2005

(65) Prior Publication Data

US 2005/0150967 A1    Jul. 14, 2005

Related U.S. Application Data

(60) Provisional application No. 60/535,289, filed on Jan. 8, 2004.

(51) Int. Cl.
G05D 23/00 (2006.01)
F22B 35/00 (2006.01)
G05D 23/32 (2006.01)

(52) U.S. Cl. ............................. 236/51; 236/22; 62/157
(58) Field of Classification Search .................. 62/22, 62/331, 157, 231; 236/94, 51, 46 R, 46 C, 236/22

See application file for complete search history.

(56) References Cited

U.S. PATENT DOCUMENTS 3,930,611 A    1/1976    Demaray (Continued)

FOREIGN PATENT DOCUMENTS

GB    2 408 592        6/2005
WO    WO 01/78307    10/2001

OTHER PUBLICATIONS

Theta Engineering, "Smart" Thermostat, website, date last visited Oct. 26, 2006, previously visited Oct. 27, 2005, 3 pages, http://www.thetaeng.com/SmartThermostat.htm.

Search Report, Great Britain Application No. 0708157.3; Date of search Jul. 26, 2007; 2 pages.

*Primary Examiner*—Chen-Wen Jiang
(74) *Attorney, Agent, or Firm*—Reinhart Boerner Van Deuren, P.C.

(57) ABSTRACT

The system of the present invention provides energy saving control for a water heater via an intelligent thermostat. This intelligent thermostat provides programmatic control over the HVAC system as is conventional, and provides coordinated control over the water heater temperature set point. This control over the water heater is accomplished via a communications network between the intelligent thermostat and the water heater. In one embodiment the communications are wireless, although wired and network bus communications may also be utilized. Enhanced and coordinated control is also provided so that different operational temperature cycles can be provided to coordinate with the intelligent thermostat's programmatic control of the HVAC system. Separate programmatic control of the water heater is also provided whereby different operational temperature modes may be commanded, e.g. Wake, Sleep, and Demand modes of operation.

18 Claims, 2 Drawing Sheets

U.S. PATENT DOCUMENTS

| | | | |
|---|---|---|---|
| 4,282,591 A | 8/1981 | Andreuccetti | |
| 4,288,990 A | 9/1981 | Schulz | |
| 4,462,540 A | 7/1984 | Dytch | |
| 4,969,508 A | 11/1990 | Tate et al. | |
| 5,023,432 A * | 6/1991 | Boykin et al. | 219/497 |
| 5,082,173 A | 1/1992 | Poehlman et al. | |
| 5,271,558 A | 12/1993 | Hampton | |
| 5,272,477 A | 12/1993 | Tashima et al. | |
| 5,289,362 A * | 2/1994 | Liebl et al. | 700/22 |
| 5,595,342 A | 1/1997 | McNair et al. | |
| 5,801,940 A | 9/1998 | Russ et al. | |
| 5,803,357 A | 9/1998 | Lakin | |
| 5,833,134 A | 11/1998 | Ho et al. | |
| 5,924,486 A | 7/1999 | Ehlers et al. | |
| 6,116,512 A | 9/2000 | Dushane et al. | |
| 6,148,146 A | 11/2000 | Poore et al. | |
| 6,213,404 B1 | 4/2001 | Dushane et al. | |
| 6,216,956 B1 * | 4/2001 | Ehlers et al. | 236/47 |
| 6,375,087 B1 | 4/2002 | Day et al. | |
| 6,449,533 B1 | 9/2002 | Mueller et al. | |
| 6,513,723 B1 | 2/2003 | Mueller et al. | |
| 6,574,581 B1 * | 6/2003 | Bohrer et al. | 702/130 |
| 6,581,846 B1 * | 6/2003 | Rosen | 236/46 R |
| 7,469,550 B2 * | 12/2008 | Chapman et al. | 62/157 |
| 2001/0048030 A1 | 12/2001 | Sharood et al. | |
| 2004/0015619 A1 | 1/2004 | Brown et al. | |
| 2004/0133314 A1 | 7/2004 | Ehlers et al. | |
| 2005/0043907 A1 | 2/2005 | Eckel et al. | |
| 2005/0194457 A1 | 9/2005 | Dolan | |
| 2006/0208099 A1 * | 9/2006 | Chapman et al. | 236/51 |
| 2006/0259183 A1 | 11/2006 | Hayes et al. | |

* cited by examiner

SYSTEM AND METHOD FOR REDUCING ENERGY CONSUMPTION BY CONTROLLING A WATER HEATER AND HVAC SYSTEM VIA A THERMOSTAT AND THERMOSTAT FOR USE THEREWITH

CROSS-REFERENCE TO RELATED PATENT APPLICATIONS

This patent application claims the benefit of U.S. Provisional Patent Application No. 60/535,289, filed Jan. 8, 2004, the teachings and disclosure of which are hereby incorporated in their entireties by reference thereto.

FIELD OF THE INVENTION

The present invention relates generally to appliance control systems, and more particularly to remote control of a water heater appliance.

BACKGROUND OF THE INVENTION

With increasing energy costs, consumers and business owners alike are becoming more energy conscience. These consumers are demanding more energy efficiency from the products that they purchase. In response, many manufacturers have responded by producing products that are more energy efficient, and products that have energy saving modes of operation that allow additional energy savings when not in use. However, since many such energy saving modes inhibit the operation of the product until it can re-enter a fully functional mode of operation, such products generally allow the consumer to set or command when such energy saving modes are entered.

One product that is used in nearly every dwelling and building, and therefore allows the potential for tremendous energy savings, is a water heater. A water heater, in simplified terms, includes a large water storage tank and a heating element that is used to heat the water in the tank to a preset temperature. This preset temperature may be adjusted by a user via an onboard thermostat. Once a desired temperature is set, most consumers do not give their water heater another thought, as long as hot water is always available when desired.

Since the water heater works to maintain the water in its storage tank at the preset temperature, these water heaters are designed with efficient insulation to minimize heat loss to the ambient to minimize energy consumption. Many water heaters also include an energy savings mode that may be set by the consumer. This energy saving mode allows the temperature of the water in the storage tank to drop to a level, e.g. 68° Fahrenheit, so as to reduce the energy usage of the water heater. In this way, the water in the storage tank will not freeze and the energy usage of the water heater will be reduced. This mode is meant to be used during extended periods of non-use, such as for summer homes or when a family is on vacation. Unfortunately, while most consumers think to turn back the main heating/air conditioning thermostat when they are going to be gone, many consumers never think to set the water heater into this mode. This may be because the water heater and its onboard thermostat are typically located in a basement or other infrequently accessed area. As a result, these consumers needlessly incur energy costs associated with maintaining the temperature in the water heater at the preset temperature, ready for use.

There exists, therefore, a need in the art for a system and method of setting a water heater into its energy saving mode of operation without requiring the consumer to access the onboard thermostat on the water heater.

BRIEF SUMMARY OF THE INVENTION

The present invention provides a new and improved system and method for conserving energy usage. More particularly, the present invention provides a new and improved method for conserving energy usage by a hot water heater by coordinating power saving operation with the HVAC system, and/or by allowing a user to separately set power saving modes for the hot water heater. For coordinated operation, setting of the HVAC system into a vacation mode also automatically sets the hot water heater into a vacation mode. For autonomous operation, the user may set different temperature modes of operation for the hot water heater for different times of day. These different modes may include different temperature set points, different tolerance bands, temperature differentials, etc.

BRIEF DESCRIPTION OF THE DRAWINGS

The accompanying drawings incorporated in and forming a part of the specification illustrate several aspects of the present invention, and together with the description serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
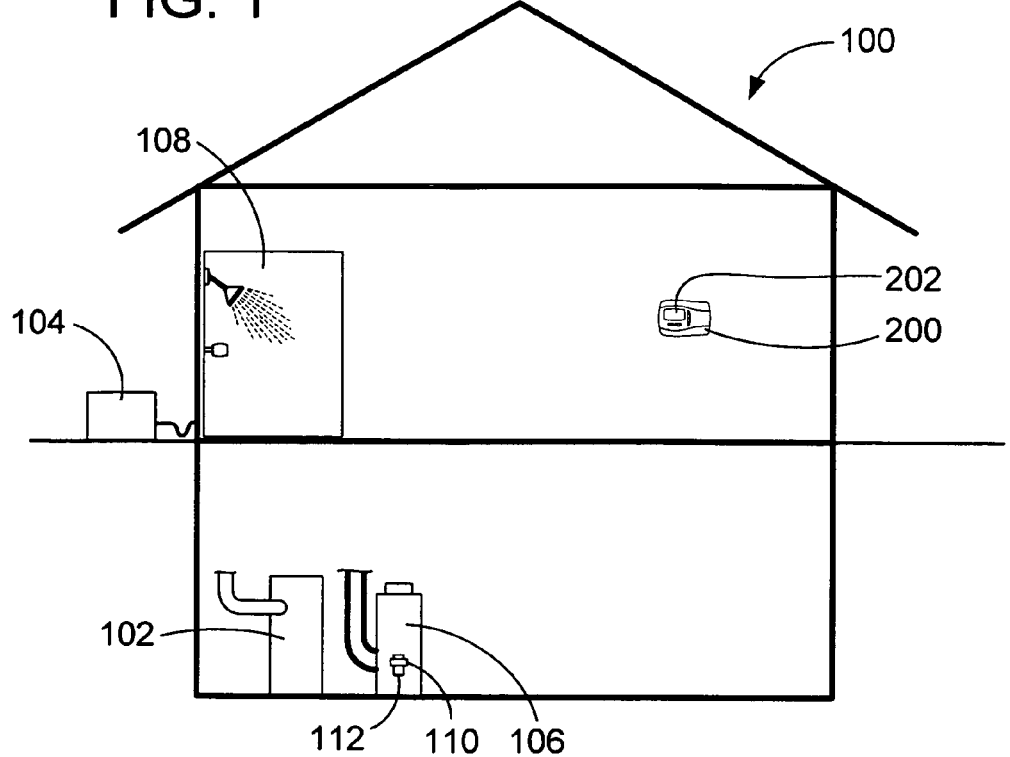
FIG. 1 is a simplified home environment diagram illustrating an environment into which the system of the present invention finds particular applicability.

FIG. 1 illustrates a simplified home environment 100 into which the system of the present invention finds particular applicability. However, one skilled in the art will recognize that the system of the present invention is not limited to a home environment, but may also be installed in a commercial environment, etc. This typical home environment 100 includes an intelligent thermostat 200. As is typical, the thermostat 200 controls heating of the home environment 100 by the furnace 102, and possibly cooling of the home environment 100 by the air conditioning system 104. The interface to both the furnace 102 and the air conditioning system 104 is typically pre-wired in the home environment 100, although the communications control from the thermostat 200 to the furnace 102 and to the air conditioning system 104 may also be wireless as desired by providing receiver/transmitter circuitry in the furnace 102 and air conditioning system 104. Similar receiver/transmitter circuitry is also required in thermostat 200 to provide this communications capability.

The typical home environment 100 also includes a hot water heater 106 to provide hot water for usage in the home environment 100, for example for use in shower 108. As will be recognized by those skilled in the art, there are typically many other uses for hot water within the home environment 100 as well as within commercial environments. The typical hot water heater includes an onboard thermostat 110 that may be set by the user to a desired water temperature for the water stored within water heater 106. Typically, this onboard thermostat 110 is the only control means provided to regulate the temperature of the water in the water heater 106. This onboard thermostat most often takes the form of a simple adjustable dial with temperature markings corresponding to the temperature set points for the hot water. These onboard thermostats 110 also typically include warning designations or positional lockouts to prevent the inadvertent setting of the onboard thermostat 110 to a setting that would result in scalding water being produced by the water heater 106.

The onboard thermostats 110 also generally include a low temperature or vacation setting. This vacation setting allows the user to reduce the energy consumption by the hot water heater 106 by reducing the temperature at which the water in the tank is maintained. Typically, such a setting results in the thermostat regulating the temperature of the water in the water heather 106 to approximately 65° F. This temperature is sufficient to prevent the water in the water heater 106 from freezing, which could result in damage to the hot water heater 106. Additionally, this temperature allows the water heater 106 to heat the water to a usable temperature within a relatively short period of time after the onboard thermostat 110 is returned to its normal setting. Unfortunately, as discussed above, since most water heaters 106 are located in generally unaccessed areas of the home environment 100, and because the user generally does not interact with the onboard thermostat 110 of the water heater 106 once originally installed, very few consumers utilize this energy-saving feature or even know of its existence.

In the system of the present invention, advantageously, the water heater 106 utilizes an electronic controller 112 to regulate the water temperature of the water heater 106. In addition to its temperature regulation function, the electronic controller 112 also includes communications capability that allows the water heater 106 to communicate with an intelligent thermostat 200. This intelligent thermostat 200, in addition to controlling the typical heating, ventilating, and air conditioning (HVAC) system components such as the furnace 102 and air conditioning unit 104, also includes programming that allows both coordinated control with the HVAC system settings as well as separate programmability of the water heater settings.

While the typical communications interface between the intelligent thermostat 200 and the furnace 102 and air conditioning unit 104 is wired, the system of the present invention additionally contemplates the usage of wireless communication between the intelligent thermostat 200 and the electronic controller 112 of the hot water heater 106. Additionally or alternatively, the system of the present invention may also include a system BUS to which each of the individual controllable appliances and the intelligent thermostat would connect. As is well-known in the art, information communicated on such a system BUS includes address information identifying and/or destination of the information transmitted thereon. Such individual addressing is not typically required in the wired network whereby each individual appliance is separately wired to the thermostat 200. Various other wired infrastructures could be utilized with the system of the present invention, and are considered within the scope thereof.

With the increasing use, sophistication, reliability, data rates, and security of wireless communication protocols, a preferred embodiment of the present invention utilizes wireless communication between the appliances and thermostat to communicate system diagnostic information and self-test control signals therebetween. However, it is recognized that not all of the consumer appliances may include such wireless communications capability. Therefore, a preferred embodiment to the thermostat 200 of the present invention includes the capability to communicate both wirelessly and through a wired connection. For the wireless communication, various wireless communication protocols and standards may be implemented depending upon the particular home environment 100 in which the system is to be installed. That is, while the Bluetooth wireless standard may be utilized in a very small environment, its range limitations may make it unsuitable for larger or typical home environments 100. However, there are numerous other wireless protocols that can be utilized to provide the wireless connectivity between the thermostat 200 and the appliances for which service diagnostic information and self-test control may be provided. These other wireless protocols include, but are not limited to, the 802.11 or 802.15 family of standards. While proprietary wireless protocols may also be utilized, the use of a standard wireless protocol ensures interoperability with appliances by different manufacturers.

Figure 2:
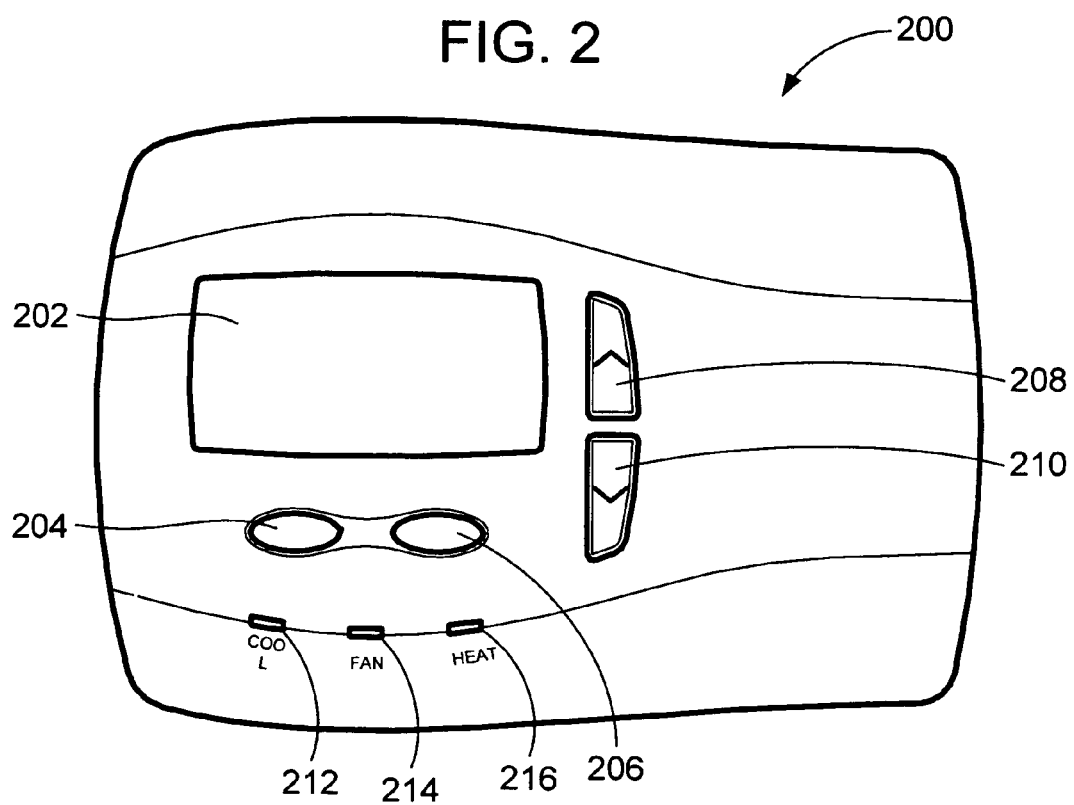
FIG. 2 is a front view illustration of an embodiment of an intelligent thermostat constructed in accordance with the teachings of the present invention.

An embodiment of a thermostat constructed in accordance with the teachings of the present invention to incorporate the features of the invention is illustrated in FIG. 2. As may be seen from this FIG. 2, this embodiment of the thermostat 200 includes a user display 202 on which is typically displayed programmatic, system, and ambient information regarding the operation of the HVAC system with which it is typically associated. This user display 202 may take various forms as are well-known in the art, and in a preferred embodiment is a dot matrix LCD display.

With such a display 202, the consumer or service person may activate various programmatic and control functions via a pair of soft keys 204, 206. The functionality executed by these soft keys 204, 206 varies dependent upon the programmatic state in which the thermostat 200 is at the time one of the soft keys 204, 206 is depressed. The particular functionality that will be instituted upon selection of one of the soft keys 204, 206 is displayed in an area of the user display 202 proximate the key 204, 206 which will institute that function. That is, the function that will be instituted upon selection of soft key 204 will be located generally in the lower left hand portion of user display 202 while the functionality that will be instituted by selection of soft key 206 will be located generally in the lower right hand portion of user display 202. These functional indicators may change depending on the program state and mode in which the thermostat is currently operating.

In addition to the soft keys 204, 206, this embodiment of the thermostat 200 of the present invention also includes adjustment keys 208, 210. These adjustment keys 208, 210 may serve to adjust a currently selected parameter up or down, such as in the case of setting the control temperature at which the thermostat will maintain the ambient environment. Additionally, these keys 208, 210 may scroll through the available data for a selected parameter, such as scrolling through alphanumeric data that may be selected for a given parameter. Such functionality will be discussed more fully below with regard to the selection of devices for which diagnostic information is desired or on which system tests are to be run. These keys 208, 210 may also function as soft keys depending on the programmatic state in which the thermostat is operating. When this functionality is provided, the function that will be instituted by selection of key 208 will be provided generally in the upper right hand corner of display 202, while the functionality that will be instituted by selection of key 210 will be displayed generally in the lower right hand corner of user display 202. In addition to the above, other user input means, such as an alphanumeric keypad, user rotatable knob, a touch screen, etc. may be utilized instead of the buttons 204, 206, 208, 210 illustrated in the embodiment of FIG. 2.

In this embodiment, the thermostat 200 also includes operating mode visual indicators 212, 214, 216. These indicators 212, 214, 216 provide a visual indication of the current operating mode of the thermostat. In the embodiment illustrated in FIG. 2, indicator 212 will illuminate while the thermostat 200 is operating in the cooling mode. Indicator 216 will illuminate while the thermostat 200 is operating in the heating mode. Finally, indicator 214 will illuminate to indicate that the fan is operating. Depending on the particular application, this indicator 214 may illuminate whenever the fan is running, or may illuminate only when the fan is selected to run continuously.

In embodiments of the present invention that do not utilize automated switching control between the heating and cooling modes of operation, these indicators 212-216 may operate as user selectable switches to allow the consumer to select the operating mode of the thermostat 200. For example, during the summer months the consumer may select the cooling mode by depressing indicator 212. In this mode, the furnace will not be turned on even if the interior ambient temperature drops below the set point. To switch from the cooling to the heating mode of operation, the consumer, in this alternate embodiment, would need to select indicator 216 to allow the thermostat 200 to operate the furnace. Consumer selection in this embodiment of indicator 214 would operate the fan continuously, as opposed to its normal automatic operation based upon a call for cooling or heat by the thermostat 200. In a still further embodiment of the present invention, as will be discussed more fully below, the indicators 212-216 may also be utilized to provide a visual indication of system trouble or trouble with one of the appliances with which the thermostat 200 is in communication.

Having discussed the physical structure of one embodiment of a thermostat 200 constructed in accordance with the teachings of the present invention, the discussion will now focus on the operation of the water heater control which forms an aspect of the present invention. Indeed, while the following discussion will utilize the structure of the thermostat 200 illustrated in FIG. 2, those skilled in the art will recognize that various other structures can be utilized without departing from the spirit and scope of the present invention. That is, regardless of the user input mechanisms utilized by the particular embodiment of the thermostat 200 of the present invention, the communications, programmatic steps, and display information provided in the following discussion may be used.

Figure 3:
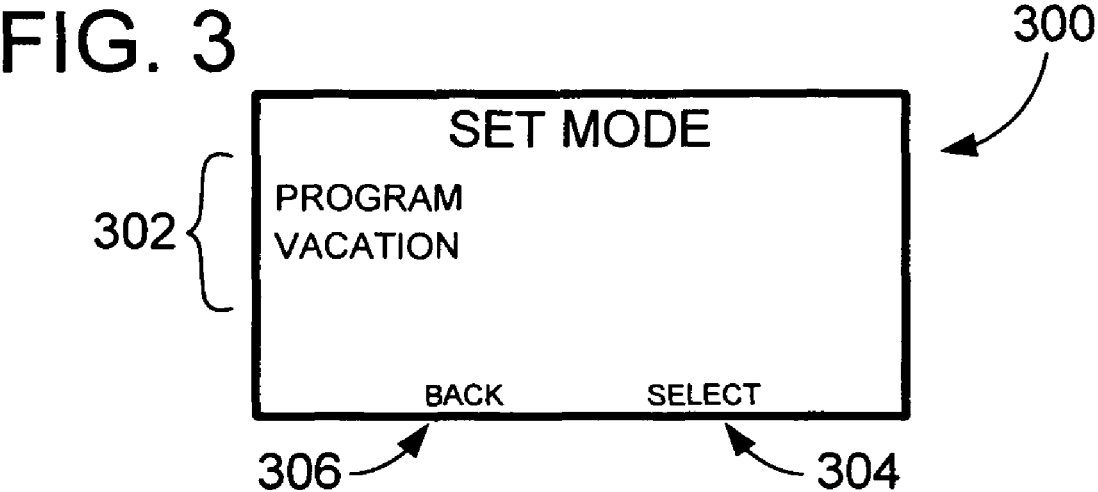
FIGS. 3-4 are exemplary user interface displays generated by an embodiment of the system of the present invention.
Figure 4:
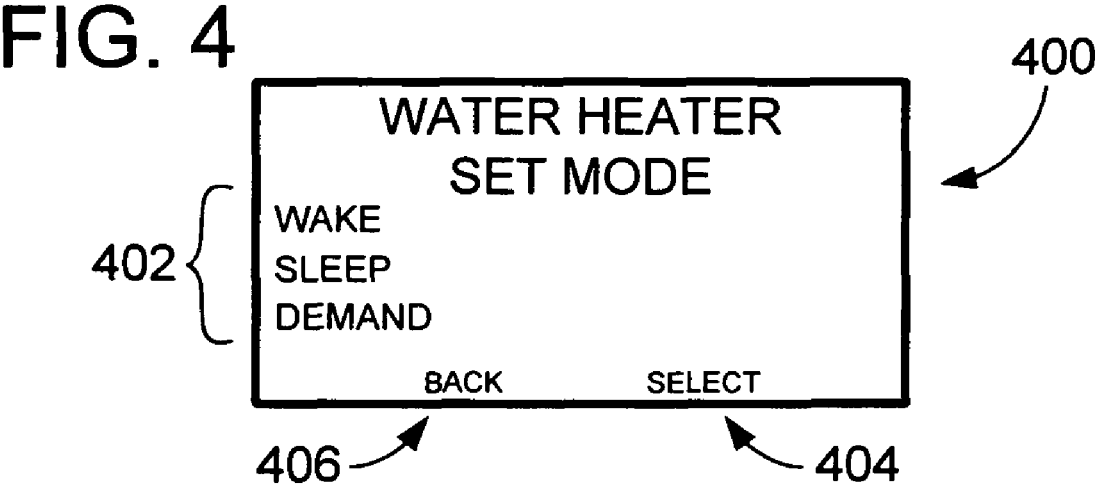

Having described an embodiment of an intelligent thermostat 200, attention is now turned to the user interface display screens generated by an embodiment of the present invention to allow user interoperability with the system of the present invention. As illustrated in FIG. 3, the intelligent thermostat 200 displays a water heater set mode screen 300 on the user interface display 202. This water heater set mode screen 300 includes a listing of the programmatic options available in area 302. In this exemplary embodiment two programmatic options are available. The first is a program setting that allows the user to program various modes of operation to ensure maximum comfort when hot water is desired and maximum energy savings at times when it is typically not in demand. The second programmatic option available in the listing of the embodiment shown in FIG. 3 is the vacation mode setting. While the preferred embodiment of the present invention automatically sets the water heater into the vacation mode when the HVAC system is set into this vacation mode, this embodiment also or alternatively allows the user to separately set the water heater into the vacation mode, regardless of the mode setting of the HVAC system. In this vacation mode, as discussed above, the water heater is allowed to reduce its energy consumption by regulating the water temperature to a low temperature, for example 65° F.

As discussed above, the user scrolls through the listing of available programmatic options by utilizing the keys 208, 210 in the embodiment shown in FIG. 2. Selection of this vacation setting will override any other programming set for the water heater 106 until the user cancels the selection. If the user were to select soft key 204, which corresponds to the back function 306, the intelligent thermostat 200 would display the screen from which the hot water heater set mode screen 300 was accessed. In one embodiment of the present invention this screen is the main menu of the thermostat 200. Selection of either of the programmatic options in area 302 is accomplished by depressing soft key 206, which corresponds to the select function 304 on the hot water heater set mode screen 300.

Assuming for a moment that the user has selected the PROGRAM option, the thermostat 200 of the present invention will display the water heater set mode screen 400. In this embodiment of the present invention, the water heater set mode screen 400 provides three programmatic modes of operation in area 402. In this embodiment the modes include a WAKE mode, a SLEEP mode, and a DEMAND mode. In each of these modes, the user may set the desired temperature set point, the temperature differential, or a combination of the two. This remote setting of the temperature set parameters is unique to the present invention.

The setting of the individual temperature set point for each of the three modes allows the user to set the desired temperature and the times of day during which each of these modes will occur. The water heater will then operate to regulate the water temperature to each of the set points during the respective modes. For embodiments of the present invention that allow setting of or operate based on temperature differentials, the actual temperature set point may remain the same, but the temperature differential may be changed. For example, the WAKE mode results in a normal temperature differential for the water heater of, for example, 15° F. That is, while the water heater is operating in the WAKE mode, the temperature of the tank is allowed to fall no lower than 15° below the set temperature. This temperature variation is sufficient for normal usage of hot water throughout the day.

The SLEEP mode of operation allows a large differential, such as 30° F. In this mode, the water heater allows the temperature of the tank to fall no lower than 30° F. below the set temperature. This mode provides the maximum operational energy savings, while still maintaining the water at a usable temperature level during the nighttime hours. The DEMAND mode of operation results in a small differential, such as 5° F. In this DEMAND mode, the water heater only allows the temperature of the water in the tank to fall no lower than 5° below the set temperature. This mode provides the most controlled water temperature, and hence the greatest energy consumption, and would typically be used only during the typical bathing times of the day.

The user is able to set the time for each of these modes of operation by first selecting one of these three programmatic modes via soft key 206 corresponding to the select function 404. Once one of the operational modes has been selected, the user may program the corresponding times for each of these modes in much the same manner as the current programming of the HVAC control modes is accomplished. The user may go back to a previous screen by selecting soft key 204, which corresponds to the back function 406 of water heater set mode screen 400. As such, this process is not described in detail herein. Allowing such programming for the hot water heater allows a user to experience the lowest energy usage during night hours, comfortable water temperature during the bathing hours, and lowered energy usage during the daylight hours. For example, a user could choose to set the SLEEP mode from the hours of 10:00 PM to 5:30 AM, the DEMAND mode from 5:30 AM to 7:30 AM, and the WAKE mode from 7:30 AM to 10:00 PM. Such programming ensures energy savings while not causing the user to experience any level of discomfort or reduction in service.

While a preferred embodiment of the present invention utilizes the intelligent thermostat 200 to coordinate the system operation discussed above, the system of the present invention also contemplates the utilization of a central control point located in a user accessible area to control operation of the system. This central control point need not be a thermostat. That is, the central control point could be a separate controller having a user interface whose functionality is limited to coordination of and communication with the hot water heater. This separate controller may be a stand alone controller, may be a PC application, etc. Additionally, in embodiments of the present invention in which an intelligent thermostat provides this central control point, the user interface and the control portions of such a thermostat need not be integrated into a single housing. That is, the user interface may be mounted in a commonly user accessed area for convenience, while the control electronics could be located remotely from the user interface.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A system for reducing energy consumption, comprising:
a hot water heater having a storage tank, a heating element and an electronic controller operable to regulate a temperature of water within the storage tank; and
an intelligent thermostat remotely located from the hot water heater for controlling a dwelling's heating, ventilating and air conditioning (HVAC) system, the intelligent thermostat operably coupled to the electronic controller of the hot water heater for communications therewith to control a temperature set point thereof;
wherein the intelligent thermostat is configured to provide a user selectable HVAC vacation mode setting for the HVAC system, and wherein the intelligent thermostat transmits a hot water heater vacation mode control signal to the electronic controller of the hot water heater when the user selectable HVAC vacation mode has been selected to initiate a hot water heater vacation mode within the electronic controller.

2. The system of claim 1, wherein the intelligent thermostat transmits a cancel hot water heater vacation mode control signal to the electronic controller of the hot water heater when the user selectable HVAC vacation mode has been deselected to cancel the hot water heater vacation mode.

3. The system of claim 1, wherein the intelligent thermostat is operably coupled to the electronic controller of the hot water heater for communications via a wired communications channel.

4. The system of claim 1, wherein the intelligent thermostat is operably coupled to the electronic controller of the hot water heater for communications via a wireless communications channel.

5. A system for reducing energy consumption, comprising:
a hot water heater having a storage tank, a heating element and an electronic controller operable to regulate a temperature of water within the storage tank;
an intelligent thermostat remotely located from the hot water heater for controlling a dwelling's heating, ventilating and air conditioning (HVAC) system, the intelligent thermostat operably coupled to the electronic controller of the hot water heater for communications therewith to control a temperature set point thereof; and
wherein the intelligent thermostat includes a user display screen, and wherein the intelligent thermostat is configured to display a hot water heater set mode menu on the user display screen, the hot water heater set mode menu including a user selectable programming setting and a user selectable hot water heater vacation mode setting.

6. The system of claim 5, wherein the intelligent thermostat transmits a hot water heater vacation mode control signal to the electronic controller of the hot water heater when the user selectable hot water heater vacation mode has been selected from the hot water heater set mode menu to initiate a hot water heater vacation mode within the electronic controller.

7. The system of claim 5, wherein the intelligent thermostat displays a hot water heater programming menu when the user selectable programming setting is selected by a user to allow a user to program different operating modes for the hot water heater.

8. The system of claim 7, wherein the operating modes provided by the intelligent thermostat comprise a wake mode, a sleep mode, and a demand mode.

9. The system of claim 8, wherein the intelligent thermostat provides programmability of at least one of temperature set point, time of day, tolerance band, and temperature differential for each of the operating modes.

10. The system of claim 8, wherein the intelligent thermostat is configured to transmit a control signal to the electronic controller to adjust hot water heater control parameters therein for each of the operating modes.

11. A thermostat for controlling a dwelling's heating, ventilating and air conditioning (HVAC) system, the dwelling having installed therein a hot water heater having an electronic controller operable to control a temperature of water held therein, the thermostat comprising:
   a user interface display; and
   a means for communicating with the electronic controller of the hot water heater;
   wherein the thermostat is configured to transmit temperature control information to the electronic controller of the hot water heater to override a temperature setpoint thereof; and
   wherein the thermostat is configured to transmit a hot water heater vacation mode control signal to the electronic controller of the hot water heater to initiate a hot water heater vacation mode within the electronic controller.

12. The thermostat of claim 11, wherein the thermostat is configured to display a set mode screen having a user selectable hot water heater vacation mode entry, and wherein the thermostat transmits the hot water heater vacation mode control signal to the electronic controller of the hot water heater when the user selectable hot water heater vacation mode has been selected.

13. The thermostat of claim 11, wherein the thermostat is configured to display a hot water heater programming menu to allow a user to program different operating modes for the hot water heater.

14. The thermostat of claim 13, wherein the operating modes provided by the thermostat comprise a wake mode, a sleep mode, and a demand mode.

15. The thermostat of claim 14, wherein the thermostat provides programmability of at least one of temperature set point, time of day, tolerance band, and temperature differential for each of the operating modes.

16. The thermostat of claim 14, wherein the thermostat is configured to transmit a control signal to the electronic controller to adjust hot water heater control parameters therein for each of the operating modes.

17. A thermostat for controlling a dwelling's heating, ventilating and air conditioning (HVAC) system, the dwelling having installed therein a hot water heater having an electronic controller operable to control a temperature of water held therein, the thermostat comprising:
   a user interface display; and
   a means for communicating with the electronic controller of the hot water heater; and
   wherein the thermostat is configured to transmit temperature control information to the electronic controller of the hot water heater to override a temperature setpoint thereof;
   wherein the thermostat is configured to transmit a hot water heater vacation mode control signal to the electronic controller of the hot water heater;
   wherein the thermostat is configured to provide a user selectable HVAC vacation mode setting for the HVAC system; and
   wherein the thermostat transmits the hot water heater vacation mode control signal to the electronic controller of the hot water heater when the user selectable HVAC vacation mode has been selected.

18. A method of reducing energy consumption of a hot water heater, comprising the steps of:
   receiving by a thermostat a user input selecting a vacation mode of operation for a dwelling's heating, ventilating and air conditioning (HVAC) system;
   transmitting by the thermostat a hot water heater vacation mode control signal to an electronic controller of a hot water heater to initiate a hot water heater vacation mode of operation controlled by the electronic controller of the hot water heater.

\* \* \* \* \*